United States Patent [19]

Parker et al.

[11] Patent Number: 4,864,564
[45] Date of Patent: Sep. 5, 1989

[54] PACKET RADIO

[75] Inventors: John P. Parker; Paul J. Stein, both of Crawley, England

[73] Assignee: U.S. Philips Corporation, New York, N.Y.

[21] Appl. No.: 55,486

[22] Filed: May 29, 1987

[30] Foreign Application Priority Data

Jun. 30, 1986 [GB] United Kingdom ................. 8615947
Nov. 28, 1986 [GB] United Kingdom ................. 8628517

[51] Int. Cl.$^4$ ............................................... H04J 3/16
[52] U.S. Cl. .................................. 370/94.1; 370/95.1
[58] Field of Search ...................... 370/95, 97, 104, 94, 370/69.1, 76; 455/33, 34, 54, 56, 57

[56] References Cited

U.S. PATENT DOCUMENTS

| | | | |
|---|---|---|---|
| 2,458,558 | 1/1949 | Bradley | 455/34 |
| 2,803,744 | 8/1957 | Berger et al. | 455/34 |
| 3,617,644 | 11/1971 | Boag | 455/34 |
| 4,546,470 | 10/1985 | Naylor et al. | 370/97 |
| 4,633,463 | 12/1986 | Mack | 370/95 |
| 4,698,805 | 10/1987 | Sasuta et al. | 370/97 |

Primary Examiner—Robert L. Griffin
Assistant Examiner—Wellington Chin
Attorney, Agent, or Firm—David R. Treacy

[57] ABSTRACT

A transceiver for a packet radio network comprises a plurality of independently tunable receivers (RX1-RX4) and a single transmitter (TX) tunable to the frequencies of the receivers. Messages on different frequencies of the network can thus be simultaneously received by respective receivers, increasing message handling capacity; additionally or alternatively, one or more of the receivers can be used as an auxiliary channel for one or more functions other than standard reception of data packets. Three auxiliary channel modes are described: Voice Net mode for direct voice communication, Time Division Multiplex Repeater mode for a long-range voice link or bulk data transfer to a single destination, and inter-network gateway mode for transmitting messages to an adjacent network.

19 Claims, 2 Drawing Sheets

Fig. 2.
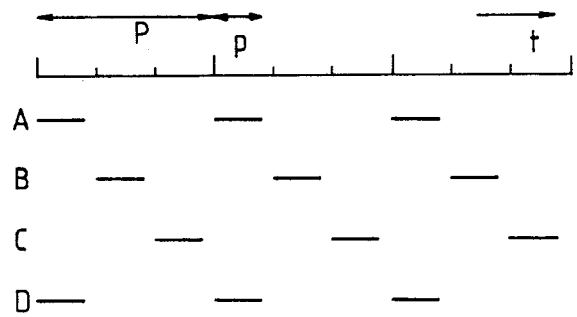
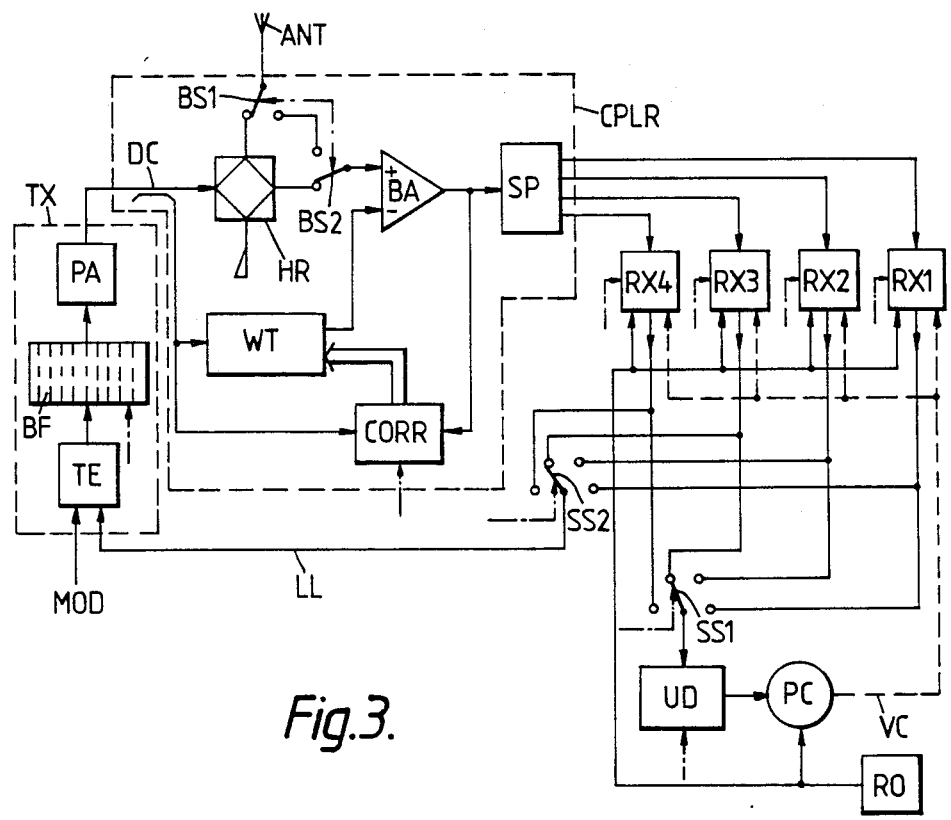
Fig. 3.

PACKET RADIO

BACKGROUND OF THE INVENTION

The invention relates to packet radio, particularly packet radio suitable for use in the tactical forward area of a battlefield.

Packet radio systems have been known for several years: see for example "Computer Networks" by Andrew S. Tanenbaum, published by Prentice-Hall (1981), and "Advances in Packet Radio Technology" by R. E. Kahn et al., Proc. IEEE, Vol. 66 (November 1978), pages 1468–1496. A packet radio system is a data communications radio network comprising a plurality of stations each including a transceiver. Each station can act a source, relayer or destination of a data message. A data message to be communicated is divided into discrete segments of fixed length, called "packets". The stations of a network are generally distributed over a geographical area in such a manner that not every station is in direct communication (i.e. communication without an intermediate station) with every other station. A packet therefore usually propagates from source to destination in a series of hops, being relayed by intermediate stations. The system selects an appropriate route for each packet depending upon the loading of individual stations, local interference and network topology. Each station can store a number of packets, possibly from different sources and possibly intended for different destinations, until they can each be forwarded to another station nearer to their respective destinations. Packets arrive at the destination station, possibly by different routes and not necessarily in the correct order, and are re-assembled to form the original message. When a station has received a packet, it transmits an acknowledgement of that fact, but this occurs for each hop in the propagation route: there is no automatic acknowledgement from destination to source (unless the stations happen to be in direct communication), so the network provides a so-called "unacknowledged datagram" service.

A packet radio system can provide mobile battlefield data users with a common communication service which is comparable, in terms of transparency of service and reliability, to a static trunk system. For this reason, packet radio is seen as a possible solution to the growing data communications requirements of the mobile electronic battlefield in an increasingly congested electromagnetic spectrum.

The designer of such a packet radio system is however presented with formidable problems: for example, the stations are mobile causing the network topology to change regularly, the propagation channel has a high information error rate which fluctuates with time, and any station may be switched off without notice.

It has recently been proposed (see "Packet Radio—A Survivable Data Communications System for the Forward Area" by B. H. Davies and T. R. Davies, Proceedings of the IEE Conference on Advances in Command, Control and Communications Systems: Theory and Applications, Apr. 16–18, 1985, pages 129–137 (IEE Conference Publication No. 247)) to use a fully distributed control strategy, employing robust routing and channel access algorithms, in order to provide improved performance, for example as regards reliability, in view of the above-mentioned problems; this system has been designed to operate within the constraints of existing narrow-band radio technology.

The present invention may similarly use available narrow-band radio technology but enables a packet radio system to have increased capabilities.

SUMMARY OF THE INVENTION

The invention provides a transceiver for a packet radio network which comprises a plurality of transceivers, the transceiver being operable to transmit, store and receive packets of data, wherein the transceiver comprises a plurality of local receivers which are independently tunable in operation and a single transmitter which in operation is tunable to the frequencies of the local receivers.

Such a transceiver may be used to receive data messages simultaneously on a plurality of the receivers, thereby increasing the message-handling capacity; additionally or alternatively, one or more of the receivers may be used as an auxiliary channel for one or more functions other than standard reception of data packets.

The transceiver may further comprise control means which in operation are co-operable with corresponding means in other transceivers of the network for causing one or more of the local receivers to be tuned in operation to the same frequency or the same respective frequencies as one or more receivers, respectively, in the other transceivers. Such control means may comprise software for a control microcomputer, the software being for example removably incorporated in the transceiver, for example in a RAM.

For increased data message handling capacity, the transceiver may comprise demodulating and data extraction means operable to handle data messages simultaneously received on at least two local receivers and storage means for storing packets of data extracted from the messages. The transceivers may then further comprise control means for causing stored packets to be transmitted in operation on a frequency to which one of said at least two receivers was tuned.

To enable one function of an auxiliary channel, the transceiver may comprise means for operating in a voice net mode, said means comprising demodulating means for demodulating a voice message received on at least one local receiver simultaneously with the reception and demodulation of messages on the remaining receiver(s). The voice net mode means may further comprise means for enabling a voice message to be transmitted continuously in operation, thereby permitting two-way voice operation. Voice messages may be received and transmitted on different respective frequencies, but suitably in operation the voice message is transmitted on the same frequency as that to which said at least one receiver is tuned. To enhance the message-handling capacity, the transceiver may be operable, except when a voice message is being transmitted, to transmit messages on one or more frequencies other than the frequency of transmission of the voice message. To enable the transmission and reception of voice messages in digital form, the transceiver may comprise voice encoding and decoding means for converting an analog voice signal to a digital voice signal and vice-versa.

To enable another function of an auxiliary channel, the transceiver may additionally or alternatively comprise control means which in operation are co-operable with corresponding means in one or more other transceivers of the network, the transceivers forming a succession from source to destination for transmission of a message, to cause a respective receiver and a transmitter of each transceiver of the succession to operate on a common radio frequency in a time division multiplex repeater (TDMR) mode with a common time frame having a characteristic period P and the period P comprising n successive time segments of equal length p where np⩾P, successive transceivers being assigned successive respective segments for transmission and every nth transceiver being assigned the same segment, wherein the transceiver comprises storage and transmission control means operable when the transceiver is the source of the message to cause the message to be divided into successive message sections of fixed length and one section to be transmitted during each periodic re-occurrence of the respective transmission segment, and wherein the transceiver comprises relay control means operable when the transceiver is intermediate the source and the destination of the message to cause a message section received from the preceding transceiver of the succession during the time segment immediately preceding its respective transmission segment to be stored and then to be transmitted in its respective transmission segment, the transceiver being operable, when receiving a message section in TDMR mode on a respective receiver, simultaneously to receive messages on the remaining local receiver(s), and being operable while in TDMR mode to transmit messages on frequencies other than said common frequency only in the intervals between periodic re-occurrences of its respective transmission segment. If the transceiver is to be operable to transmit and receive voice messages in TDMR, it may comprise voice encoding and decoding means operable to convert an analog voice signal to a digital signal with a bit rate p/P times the bit transmission rate and vice-versa.

To enable yet another function of an auxiliary channel, the transceiver may additionally or alternatively comprise means for operating in an inter-network gateway mode, said means comprising means which in operation are co-operable with corresponding means in at least one of a plurality of other transceivers comprised in an adjacent packet radio network to cause one of the local receivers to be tuned to the same frequency $f_1$ as a receiver in each of said plurality of other transceivers, means for causing a packet which has been received on another receiver of the transceiver from a transceiver in its own network and which has then been stored to be transmitted to a transceiver in said adjacent network on said frequency $f_1$ together with an identification of the packet as an inter-network message, and means responsive to the reception of a packet with such an identification to cause an acknowledgement of reception of the packet to be transmitted on the same frequency as that on which it was received.

Without taking special measures, a transceiver embodying the invention can be used in half-duplex operation, that is to say, although it can both transmit and receive, it cannot transmit and receive simultaneously, since the transmitter would overload each of the local receivers, whatever frequencies they are tuned to. To enable full duplex operation, a transceiver may comprise means for substantially inhibiting the passage of RF energy from the transmitter to the receivers at frequencies other than the desired instantaneous transmitter frequency so that reception is prevented solely in the local receiver tuned to said desired transmitter frequency.

Embodiments of the invention will now be described, by way of example, with reference to the diagrammatic drawings:

BRIEF DESCRIPTION OF THE DRAWING

FIG. 2 illustrates transmission periods of packet radio transceivers in TDMR mode, and FIG. 3 is a circuit block diagram of an arrangement for tuning the receivers and the transmitter and coupling them to the antenna for full duplex operation.

DESCRIPTION OF THE PREFERRED EMBODIMENTS

Figure 1:
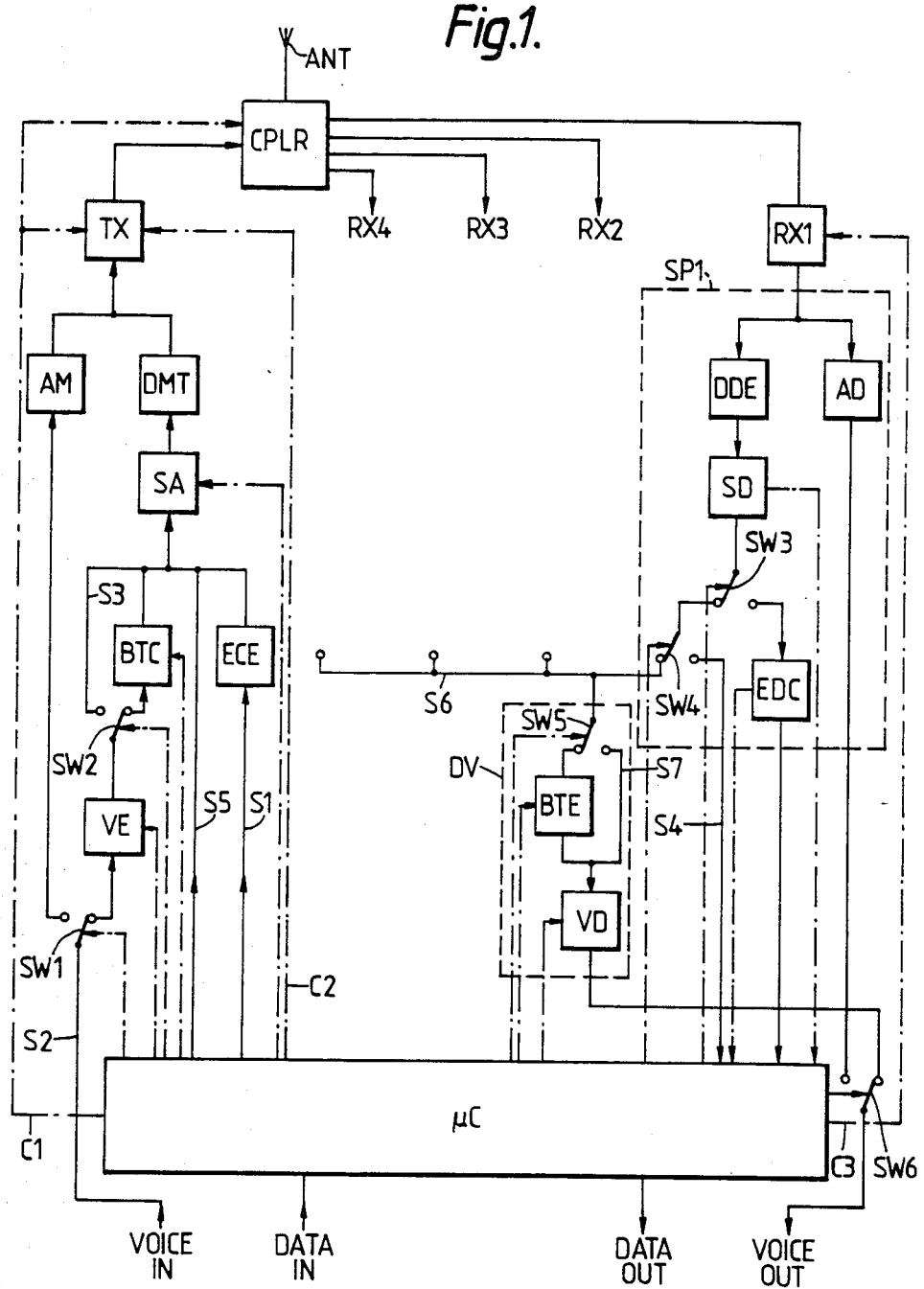
FIG. 1 is a block diagram of a packet radio transceiver embodying the invention.

FIG. 1 is a simplified schematic block diagram of a transceiver for a packet radio network. The network comprises a plurality of similar stations each including such a transceiver and also including host computer capabilities. In the transceiver of FIG. 1, a common antenna ANT is used for both transmission and reception; it is coupled by a coupling unit CPLR to a single RF transmitter TX and/or to a plurality of RF local receivers, in this instance four receivers RX1-RX4 respectively. The receivers are independently tunable over respective frequency ranges, which may for example overlap or be contiguous; suitably, and in this instance, the tuning frequency ranges of the receivers are substantially coextensive. The transmitter can be fast-tuned to the frequencies of the local receivers; thus in this instance, it has the same tuning frequency range as each receiver, for example 30-88 MHz.

The operation of the transceiver is controlled by a microcomputer μC which also performs other processing on data packets. In FIG. 1, the paths of communication signals are denoted by continuous lines, while other links between the microcomputer μC and other circuit blocks are denoted by dash-dot lines.

Digital data communications signals or analog voice communications signals to be transmitted by the transceiver are supplied to the microcomputer μC at DATA IN, VOICE IN respectively. Digital data signals are divided by the microcomputer μC into discrete successive segments or "packets" each comprising the same number of bits. The microcomputer also prefixes each packet with an address indicating the identities of the source station, the station comprising this transceiver (if it is acting as a relay rather than being the source), and the destination. When a packet is to be transmitted, it is passed along a signal path S1 to an error correction encoding and interleaving unit ECE which adds parity bits to the packet in order to enable the transceiver that next receives the packet to correct errors that occur in transmission between the transceivers; the unit ECE also alters the order of the bits in the packet so that errors which tend to be grouped together in time are spread more evenly across the packet, thereby improving the possibility of correcting the errors after reception. The packet then passes to a sync addition unit SA, controlled by the microcomputer μC, that prefixes the packet with a word identifying the start of the packet and identifying the mode of transmission. Thence the packet passes to a digital signal modulating and timing (clock) unit DMT which modulates the transmitter TX, for example frequency modulating the RF carrier, with the data in the packet at a predetermined regular bit rate, for example 16 kilobits per second. The transmitter is switched on and off as appropriate by means of a control line C1 from the microcomputer μC, and the radio frequency of the transmitter is controlled via a control line C2. The control line C1 also controls the coupler CPLR so as to cause the antenna ANT to be coupled to the transmitter only when the latter is operating.

Voice signals, in analog form, are supplied along a signal path S2 to a switch SW1 controlled by the microcomputer. If the voice signals are to be communicated in a voice net mode wherein the signals are transmitted continuously in analog form as supplied, the switch SW1 routes the signals to an analog signal modulator AM which controls the transmitter TX accordingly, for example using frequency modulation. If, on the other hand, the signals are to be transmitted in digital form, the switch SW1 routes the signals to a voice encoder VE which for voice net mode operates at the normal bit transmission rate. From here, the digital voice signals pass to the sync addition unit SA, being routed by a switch SW2, controlled by the microcomputer μC, either directly via a signal path S3 if the signals are to be transmitted continuously, or via a buffer and time compression unit BTC, also controlled by the microcomputer, if the signals are to be transmitted intermittently at regular intervals in a Time Division Multiplex Repeater (TDMR) mode (to be described below); in the latter case, the voice encoder is operated at a relatively low bit rate, the rate being controlled by the microcomputer μC. From the sync addition unit SA, the signals pass to the unit DMT (as with packets of digital data).

The four local receivers RX1-RX4 are each followed by identical respective signal-processing circuit portions; for simplicity, only the circuit portion SP1 following receiver RX1 is shown in FIG. 1, enclosed by a line of short dashes. The frequency to which the receiver RX1 is tuned is controlled via a control line C3 from the microcomputer μC. The output of the receiver is coupled to an analog signal demodulator AD and to a digital signal demodulator and bit extraction unit DDE. Modulated RF signals that are analog voice signals are demodulated by the analog signal demodulator AD and supplied to a switch SW6 controlled by the microcomputer μC whence they are passed directly to a VOICE OUT output. Modulated RF signals that are digital signals are demodulated and the digital information extracted by a threshold detector and clock recovery circuit in the unit DDE. The signals then pass to a sync detector unit SD which identifies from the sync word the start of a group of bits and the mode in which the group is being communicated. This information is passed by the unit SD to the microcomputer μC via a data line D1. The output of the unit SD is connected to a switch SW3 which is controlled by the microcomputer μC in accordance with the information supplied to it by the unit SD along the line D1, as are further switches SW4 and SW5 to be mentioned below.

Packets of digital data are routed by switch SW3 to an error detection and correction and deinterleaving unit EDC which utilizes the parity bits to correct errors (if possible) and which restores the original order of the bits in each packet. The packets pass from the output of the unit EDC to the microcomputer μC. If the errors in a packet are too numerous to be corrected, the unit EDC notifies the microcomputer μC via a data line D2, and the microcomputer then discards the packet. When a packet has been successfully received and the station is nearer the destination than the station that transmitted the packet, the microcomputer adds an acknowledgement of this fact to the next packet it transmits (irrespective of whether this packet is the one whose reception is being acknowledged).

Digital voice signals are routed by switch SW3 to the further switch SW4. If the transceiver is acting as a relay for voice signals in TDMR mode, the signals are passed directly from switch SW4 along a signal path S4 to the microcomputer μC whence, at suitable instants for transmission, they are passed along a signal path S5 to the sync addition unit SA. If the transceiver is the destination of the voice signals (in either TDMR mode or voice net mode), the signals are routed by switch SW4 to a digital voice channel DV which can be coupled to any of the signal processing circuit portions associated respectively with the receivers RX1-RX4, as denoted by signal path S6 with a respective switch pole for the signal processing circuit portion associated with each receiver. The digital voice channel DV is enclosed by a line of short dashes. From the input of the channel DV, digital signals in voice net mode are routed by the further switch SW5 via a signal path S7 to a voice decoder VD which converts the signals to analog form and supplies them from the output of DV to the switch SW6 to be passed directly to the VOICE OUT output. If the digital voice signals at the input of DV are in TDMR mode (the transceiver being the destination of the signals), they are routed by switch SW5 to a buffer and time expansion unit BTE whose output is connected to the voice decoder VD. Like the voice encoder VE, the voice decoder can operate at either of two rates, the rate being controlled by the microcomputer μC.

If the transceiver is intended for half duplex operation, in which the transceiver cannot transmit and receive signals simultaneously, the coupler CPLR may be a simple device, for example a relay, which couples the antenna ANT either to the transmitter TX or to each of the four receivers RX1-RX4, as required. Alternatively, if the transceiver is intended for full duplex packet radio operation, in which packets can be received at the same time as a packet is being transmitted, with the exception of reception at the frequency of the transmitted signal, a more complex coupler is required, for example as described below with reference to FIG. 3, for inhibiting the passage of RF energy from the transmitter to the receivers at frequencies other than the desired instantaneous transmitter frequency when the transmitter is operating; the antenna can be directly coupled to the receivers when the transmitter is not operating.

In operation, any of the local receivers RX1-RX4 and their associated signal-processing circuit portions may be used for receiving data packets; packets may be simultaneously received and processed in a plurality of channels. Furthermore, any one (or if necessary, more) of the channels may, instead of handling packets in the normal way, be used as an auxiliary channel. In multi-channel (for example, 3 channel) packet radio operation, the microcomputer co-operates with other transceivers in the same packet radio network to select a plurality of common frequencies of operation, in this instance three common frequencies of operation. The transceiver may simultaneously receive packets on the three common frequencies in respective receivers and process the packets in the respective signal-processing circuit portions associated with the receivers, from where they are passed to the microcomputer. If the transceiver is the destination of a packet, the packet is presented at the DATA OUT output. If a packet is to be relayed to another transceiver, it is entered into a store in the microcomputer from which it can be selected for transmission at an appropriate instant. When this store is full, further packets received for relaying are discarded; however, control information sent between stations ensures that this rarely occurs. Packets to be transmitted (either being relayed or originating at the station comprising the transceiver) may be transmitted on any of the common operating frequencies (irrespective, in the case of a transceiver acting as a relay, of which of the common frequencies it was received on).

The common frequency on which a transceiver transmits a packet to transceivers in its own network may be selected randomly by the transceiver from amongst the common frequencies except, in the case of full duplex packet radio operation, the one(s) on which the transceiver is simultaneously receiving a message (having detected the sync word); in half-duplex operation, transmission cannot proceed if a message is being received on any of the local receivers.

Data packets transmitted by the transceivers are retained in a store in the microcomputer $\mu$C after first transmission for retransmission if a suitable acknowledgement of reception is not received within a given time. Packets are discarded from this store after an acknowledgement has been received or if, after repeated transmission over a given period, no acknowledgement is received.

In this embodiment, an auxiliary channel may be operated in any of three modes:

voice net mode, for direct voice communication with one or more other stations;

TDMR mode, for a long-range voice link or bulk data transfer to a single destination station;

inter-network gateway mode, for transmitting messages to an adjacent packet radio network.

Voice net mode is used when it is desired to receive a voice message substantially without delay from another station which may be in the same packet radio network or, for example, in a separate network of radio stations capable only of voice transmission and reception. Other stations of the voice net may be in one or both of such networks. The transceiver may additionally be capable of transmitting such a message. In this embodiment, the transceiver is capable both of receiving and of transmitting voice net messages, and in either digital or analog form; as an alternative, a transceiver might for example only receive voice net messages, acknowledgements being sent via packets. Where voice net messages can be both received and transmitted, reception and transmission are usually on the same frequency in which case operation is half-duplex voice but may be on different frequencies for full duplex voice operation.

TDMR mode is used when it is desired to transmit, with minimal delay, a voice message or a substantial quantity of data from a source to a destination which are not in direct communication with one another, i.e. there being one or, usually, a plurality of intermediate relay stations. In this mode, the transceivers establish a circuit-switched link, designating a succession of transceivers from source to destination which are to operate in this mode on a common frequency and with a common time frame having a characteristic period P. The period P comprises n successive segments of equal length p such that $np \gtrsim P$, successive transceivers in the link (with the possible exception of the last) being assigned successive respective segments for transmission and every nth transceiver being assigned the same segment. The transceiver of the source station divides the message to be communicated into successive message sections each comprising a fixed number of bits (representing either data or voice), and transmits one section during each periodic re-occurrence of its respective transmission segment. In the case of a data message, this is performed by entering the data into a buffer store in the microcomputer $\mu$C, the buffer store having a capacity of one message section, from where it is supplied at the appropriate instant to the sync addition unit SA via signal path S6. In the case of a voice message, time compression is required. If, for example, n=3, the voice encoder VE may convert the analog voice signal to a digital voice signal with a bit rate of 4.8kbit/sec. The buffer and time compression unit then compresses this into message sections having the normal bit transmission rate of 16kbit/sec, each section occupying a time segment having a length rather less than one third of the period P and being transmitted in the respective time segment for that transceiver.

A transceiver acting as a relay in a TDMR mode link receives a message section from the preceding transceiver in the link during each periodic re-occurrence of the time segment immediately preceding its own transmission segment, and transmits the section in its respective transmission segment. The short interval between the transmission segments permits the transceiver to recognize the data being received as such a message section and (if necessary) to retune its transmitter.

By way of example, FIG. 2 illustrates schematically the times at which four successive stations, designated A,B,C,D respectively, in a TDMR link transmit. The transmission segments are denoted by bars extending parallel to the time scale (t).

A transceiver which is the destination in a TDMR mode link passes data message sections from the DATA OUT output of the microcomputer $\mu$C to the host computer of the station for re-assembly into the original message. Voice message sections are fed into the buffer and time expansion unit BTE which from the spaced sections having a bit rate of, for example, 16 kilobits per second produces a continuous bit stream with a bit rate of, for example, 4.8 kilobits per second and supplies this to the voice decoder VD. If desired, the destination transceiver may transmit received message sections in each periodic re-occurrence of a respective transmission segment, as a form of acknowledgement to the penultimate transceiver in the link.

TDMR mode operation relies on transceivers which transmit in the same time segment being sufficiently separated in space not to interfere with one another as regards reception by the respective next successive transceivers in the link. To increase the probability of successful operation in this mode, the process of setting up a circuit-switched link in this mode may use transmitter power control in each transceiver (except the last) to try to ensure that the signal strength received by the next succeeding transceiver in the link is adequate but no more; for example, each transceiver (except the first) may transmit to the respective preceding transceiver in the link information on the strength of a signal previously received from said respective preceding transceiver, and said respective preceding transceiver may then set the power level to be used for transmitting message sections in TDMR mode so that, for example, the received signal strength in this mode would provide a given signal-to-noise ratio, assuming no changes in propagation conditions and network topology.

The inter-network gateway mode is used when it is desired to pass a message from one packet radio network to an adjacent packet radio network. The number of packet radio stations in a network is limited, for example to 64 stations, because of the communication capacity required to distribute information on the topology of the network rather than to convey data messages; consequently, a larger number of stations must be configured as a plurality of mutually adjacent networks having different respective common frequencies. Interlinking the networks has hitherto typically required a "full gateway" consisting of two interconnected transceivers which are respectively members of two adjacent networks. Messages received on the common frequency of either one of the networks are transmitted on the common frequency of the other network. This has the disadvantages that the inter-network mode requires equipment to be permanently dedicated to it and that it depends on the dedicated equipment functioning satisfactorily. By contrast, in networks of transceivers embodying the invention, any transceiver in one network may operate as a half-gateway to an adjacent network by co-operating with one or more transceivers of the adjacent network to tune its auxiliary channel local receiver to a common frequency $f_1$ of the adjacent network and, when a packet local received on one of its other receivers from a transceiver of its own network is to be transmitted to the adjacent network, tuning its transmitter to the frequency $f_1$. In this case, a flag in the message indicates that the packet is part of an inter-network message; this causes reception to be acknowledged by a similar transceiver in the adjacent network on the same frequency $f_1$ (rather than on another of the common frequencies of the adjacent network), and the acknowledgement can be received on the auxiliary channel receiver. A corollary of this mode of operation is that any such transceiver in a network may receive a packet from an adjacent network without taking special measures.

When a transceiver operates in voice net mode or in TDMR mode, the use of its transmitter for that mode takes priority over the normal transmission of packets, and packets to be transmitted must be stored until the transmitter is no longer required for that mode. However, packets may be transmitted between the transmission of speech messages (in voice net mode) and in the interval between periodic re-occurrences of the respective transmission segment (in TDMR mode). (In voice net mode, the use of the transmitter for that mode may be controlled by a button on a microphone that causes an appropriate control signal to be supplied to the microcomputer.)

A transceiver embodying the invention may simply operate as a multi-channel packet radio, and may not have facilities for auxiliary channel operation. However, it will be clear that the provision of a local receiver with the capability for auxiliary channel operation while permitting simultaneous reception of normal packet messages on the remaining local receiver(s) significantly enhances the usefulness of the transceiver. An auxiliary channel may be operable in any one or more of the above-described modes. When an auxiliary channel is operable in two or all three of the described modes, the transceiver suitably is co-operable with one or more other transceivers in the network to determine which mode is to have priority at any time when more than one of the modes is desired.

As an alternative to the above described embodiment wherein the identical signal-processing channels associated with the four receivers RX1–RX4 allows any of the receivers to be used for the auxiliary channel, a single receiver may be dedicated for use for the auxiliary channel. In that case, there would be associated with that receiver the circuit blocks of the signal processing channel SP1 and the digital voice channel DV of FIG. 1, while there would be associated with each of the remaining receivers the circuit blocks DDE, SD and EDC of FIG. 1 (there being a permanent connection from the output of SD to the input of EDC). This would somewhat simplify the circuitry, but the arrangement of FIG. 1 has the advantage that auxiliary channel operation is still possible even if one or two of the receivers fails.

An auxiliary channel may be used in a mode other than those described above, for example as a free-channel search receiver.

FIG. 3 is a circuit block diagram showing one arrangement for tuning the local receivers and the transmitter and for coupling them to the antenna for full duplex operation. Portions of the circuit of FIG. 3 corresponding to the transmitter TX and the coupler CPLR in FIG. 1 are enclosed by lines of short dashes. Control links to various circuit blocks from the microcomputer $\mu$C are denoted by dash-dot lines. The transmitter comprises a transmitter exciter TE supplied (as will be described below) with a stabilized low-power RF carrier signal and with a modulating signal MOD from an analog signal or a digital signal modulator. The output of the transmitter exciter TE is fed to a bank of bandpass filters, BF, the filters having contiguous passbands covering the operating frequency range of the transceiver. The filters are controlled by the microcomputer $\mu$C of the transceiver by means of PIN diode switches, the microcomputer selecting the appropriate filter so as to reduce transmitter noise at frequencies outside a narrow band including the desired operating transmission frequency. Since the common frequencies of the packet radio network must be sufficiently spaced for adjacent frequencies to lie in the respective passbands of different filters if it is to be possible for the transceiver to receive messages, while transmitting, at each common frequency except that of the transmission, the narrower the passbands of the filters, the less is the constraint on the minimum spacing of adjacent common frequencies.

The output of the filter bank is fed to a power amplifier PA which in turn is connected to a first port of a hybrid ring HR. Second and third ports of the hybrid ring are respectively connected to one pole of two two-pole bypass switches BS1 and BS2, and the fourth port of the hybrid ring is connected to a matched load. The second poles of the bypass switches are connected together. The input of the switch BS1 is connected to the common antenna ANT, and the output of the switch BS2 is connected to the positive input of a broadband differential RF buffer amplifier BA. The bypass switches are controlled by the transceiver microcomputer so that when it is desired only to receive and not to transmit signals, the antenna is directly connected to the buffer amplifier BA and is disconnected from the hybrid ring, the switches being in the positions shown in FIG. 3. When it is desired to transmit as well as to receive, the microcomputer puts each bypass switch into its other position so that the antenna is connected both to the output of the power amplifier PA and to the input of the buffer amplifier BA via the hybrid ring.

The buffer amplifier BA, whose output is coupled by a splitter SP to the input of each of the receivers RX1-RX4, is used in an interference cancellation loop so that when the transmitter is operating, the magnitude of the signal at the desired transmission frequency that reaches the input of each receiver lies within the dynamic range of the receiver and hence does not overload the receiver. The cancellation loop further comprises a directional coupler DC, a weighting unit WT and a correlator CORR which controls the weighting unit and is itself controlled by the transceiver microcomputer. The directional coupler DC supplies a small portion of the transmission frequency signal from the output of the power amplifier PA to the input of the weighting unit WT and to one input of the correlator CORR. The other input of the correlator receives the output signal of the buffer amplifier. The weighting unit supplies from its output to the negative input of the buffer amplifier BA a version of the weighting unit's input signal that is weighted in both amplitude and phase, the weighting being controlled by the correlator in such a manner as to tend to minimize the correlation between the two input signals to the correlator.

Other interference cancellation arrangements may be used: see for example the paper "A Signal Separation Adaptive Nulling System for Military Radio" by R. J. Murray, 2nd IERE International Conference on Radio Receivers and Associated Systems, University College of North Wales, July 1986.

Decoupling of the transmitter from the receivers is thus provided by the bandpass filter bank BF, the hybrid ring HR, and the cancellation loop. The bandpass filters and the hybrid ring together reduce the magnitude of signals that reach the receivers from the transmitter at frequencies to which the receivers may be tuned, other than the transmitter frequency, to below the level of the minimum wanted signal in each receiver; the hybrid ring and the cancellation loop together reduce the signals that reach the receivers from the transmitter at the desired transmitter frequency to a level within the dynamic range of the receivers.

In operation, prior to transmitting communication messages, the transmitter may be tuned in turn to each of the common frequencies of the packet radio network and the correlator allowed to determine the weighting which gives optimum cancellation at each of the frequencies. The values of the weights may then be stored in association with the respective frequencies and, when the transmitter is subsequently used to transmit a message, the respective stored value of weight may be used to attenuate the transmission frequency signal that reaches the receivers. Since propagation conditions vary with time, this calibration procedure may be repeated from time to time. Furthermore, the correlator may adjust the weight from the stored value in the course of a transmission if this is necessary to optimize the cancellation.

As an alternative to the use of a single common antenna with a hybrid ring to provide isolation between the transmitter and the receivers, a single antenna might be used with a circulator; this would alleviate the disadvantage of a loss of at least 3 dB in both the transmission path and the reception path that occurs with the hybrid ring. As a further alternative, isolation might be provided by the use of two separate antennae respectively for transmission and reception, for example two collinear antennae.

The tuning of the local receivers and the transmitter will now be described. Each receiver comprises a voltage-controlled oscillator (VCO) as a local oscillator and a harmonic locking loop (not shown). A reference oscillator RO supplies a highly stabilised, relatively low frequency to each receiver, this frequency being equal to the channel spacing (e.g. 25 kHz). The harmonic locking loop in each receiver comprises a phase comparator which compares the reference oscillator signal with the signal of the respective VCO, and thereby locks the VCO frequency to an integral multiple of the reference frequency. Without any other control, the value of the integral multiple would be random. In order to tune a receiver to a desired frequency, the microcomputer opens the harmonic locking loop of the receiver, connecting the control input of the receiver's VCO to an external voltage control line VC (denoted in FIG. 3 by a line of long dashes). The output of the VCO, which is connected to a respective pole of a selector switch SS1, is routed by this switch under the control of the microcomputer to a universal frequency divider UD. This divides the VCO frequency by an integer whose value is controlled by the microcomputer and is equal to the value of said integral multiple which will give the desired local oscillator frequency. The output of the universal divider is passed to one input of a frequency-sensitive phase comparator PC, which at a second input receives the sampled output of the reference oscillator and whose output is the voltage control line VC. In this manner, the VCO is locked to the appropriate multiple of the reference frequency. When the frequency has settled, the harmonic locking loop is then closed again, the VCO being disconnected from the control line VC, and the harmonic locking loop of the receiver maintains the VCO output at the same multiple of the reference frequency.

In this embodiment, the receivers are direct conversion receivers, with zero intermediate frequency. Their respective local oscillator frequencies are thus the frequencies to which the receivers are respectively tuned. This enables the transmitter to be tuned in a simple manner to the same frequency as any of the receivers. The output of the respective VCO of each receiver is connected to a respective pole of a second selector switch SS2 controlled by the microcomputer, which supplies the VCO signal of the desired receiver along a local oscillator line LL to the transmitter exciter TE. The local oscillator of the receiver thus also acts as the transmitter oscillator.

If it is desired also to be able to tune the transmitter to a frequency in the operating range that is not the same as the frequency to which any of the local receivers is instantaneously tuned, an additional VCO and harmonic locking loop may be provided, the VCO input being connectable to the voltage control line VC and the VCO output being connected to respective further poles on the selector switches SS1 and SS2 and being thereby connectable to the universal frequency divider UD and the transmitter exciter TE.

We claim:

1. A transceiver for a packet radio network which comprises a plurality of other transceivers, said transceiver including means for transmitting, storing and receiving packets of data, wherein said transceiver comprises a plurality of local receivers which are independently automatically tunable during operation, and a single transmitter which in operation is tunable to the frequencies of the local receivers, further comprising means for receiving a control signal via one of said local receivers, and means responsive to said control signal for controlling a tuning frequency of at least one of said local receivers to be the same as the respective tuning frequencies of respective other receivers in an other transceiver operating as part of the packet radio network.

2. A transceiver as claimed in claim 1 comprising demodulating and data extraction means operable to handle data messages simultaneously local received on at least two said receivers and storage means for storing packets of data extracted from the messages.

3. A transceiver as claimed in claim 2 further comprising control means for causing stored packets to be transmitted in operation on a frequency to which one of said at least two local receivers was tuned.

4. A transceiver as claimed in claim 3 comprising means for operating in a voice net mode, said means comprising demodulating means for demodulating a voice message received on at least one said local receiver simultaneously with the reception and demodulation of messages on the remaining receiver(s).

5. A transceiver as claimed in claim 1 comprising means for operating in a voice net mode, said means for operating comprising demodulating means for demodulating a voice message received on at least one said local receiver simultaneously with the reception and demodulation of messages on the remaining receiver(s), wherein the voice net mode means further comprises means for enabling a voice message to be transmitted continuously in operation.

6. A transceiver as claimed in claim 5 wherein in operation the voice message is transmitted on the same frequency as that to which said at least one receiver is tuned.

7. A transceiver as claimed in claim 6 wherein the transceiver is operable, except when a voice message is being transmitted, to transmit messages on one or more frequencies other than the frequency of transmission of the voice message.

8. A transceiver as claimed in claim 7 comprising voice encoding and decoding means for converting an analog voice signal to a digital voice signal and vice-versa.

9. A transceiver for a packet radio network which comprises a plurality of other transceivers, said transceiver including means for transmitting, storing and receiving packets of data, wherein said transceiver comprises a plurality of local receivers which are independently automatically tunable during operation, and a single transmitter which in operation is tunable to the frequencies of the local receivers, comprising demodulating and data extraction means operable to handle data messages simultaneously received on at least two said local receivers and storage means for storing packets of data extracted from the messages.

10. A transceiver for a packet radio network which comprises a plurality of transceivers, the transceiver being operable to transmit, store and receive packets of data, wherein the transceiver comprises a plurality of local receivers which are independently tunable in operation, a single transmitter which in operation is tunable to the frequencies of the receivers, control means, co-operable in operation with corresponding means in other transceivers of the network, for causing one or more of the local receivers to be tuned in operation to the same frequency or the same respective frequencies as one or more receivers, respectively, in the other transceivers, the transceivers forming a succession from source to destination for transmission of a message to cause a respective receiver and a transmitter of each transceiver of the succession to operate on a common radio frequency in a time division multiplex repeater (TDMR) mode with a common time frame having a characteristic period P and the period P comprising n successive time segments of equal length p where $np \leq P$, successive transceivers being assigned successive respective segments for transmission and every nth transceiver being assigned the same segment, storage and transmission control means operable when the transceiver is the source of the message to cause the message to be divided into successive message sections of fixed length, and to cause one section to be transmitted during each periodic re-occurrence of the respective transmission segment, and relay control means operable when the transceiver is intermediate the source and the destination of the message to cause a message section received from the preceding transceiver of the succession during the time segment immediately preceding its respective transmission segment to be stored and then to be transmitted in its respective transmission segment, the transceiver being operable, when receiving a message section in TDMR mode on a respective receiver, simultaneously to receive messages on the remaining local receiver(s), and being operable while in TDMR mode to transmit messages on frequencies other than said common frequency only in the intervals between periodic re-occurrences of its respective transmission segment.

11. A transceiver as claimed in claim 10, comprising means for operating in a voice net mode, said means comprising demodulating means for demodulating a voice message received on at least one said receiver simultaneously with the reception and demodulation of messages on the remaining local receiver(s).

12. A transceiver as claimed in claim 10, comprising demodulating and data extraction means operable to handle data messages simultaneously received on at least two said receivers and storage means for storing packets of data extracted from the messages.

13. A transceiver as claimed in claim 10 operable to transmit and receive voice messages in TDMR mode, wherein the transceiver comprises voice encoding and decoding means operable to convert an analog voice signal to a digital signal with a bit rate p/P times the bit transmission rate and vice-versa.

14. A transceiver as claimed in claim 13, comprising means for operating in an inter-network gateway mode, said means for operating comprising means for identifying a signal received on one of said local receivers as being a signal transmitted from an adjacent packet radio network, means responsive to said means for identifying, for causing one of the local receivers to be tuned to a same frequency $f_1$ as an other receiver in said adjacent network, means for causing a packet which has been received on a different local receiver, from a different transceiver in said transceivers own network, to be stored and then to be transmitted to a transceiver in said adjacent network on said frequency $f_1$ together with an identification of said packet as an inter-network message, and means responsive to a local receiver receiving a packet associated with an identification of the packet as an inter-network message to cause an acknowledgement of receipt of the packet associated with the inter-network message to be transmitted on the same frequency as that on which the packet and associated identification were received.

15. A transceiver as claimed in claim 14 comprising means for substantially inhibiting the passage of RF energy from the transmitter to the receivers at frequencies other than the desired instantaneous transmitter frequency so that reception is prevented solely in the receiver tuned to said desired transmitter frequency.

16. A transceiver for a packet radio network which comprises a plurality of other transceivers, said transceiver including means for transmitting, storing and receiving packets of data, wherein said transceiver comprises a plurality of local receivers which are independently automatically tunable during operation, and a single transmitter which in operation is tunable to the frequencies of the local receivers, further comprising means for receiving a control signal via one of said local receivers, and means responsive to said control signal for controlling a tuning frequency of at least one of said local receivers to be the same as the respective tuning frequencies of respective other receivers in an other transceiver operating as part of the packet radio network, demodulating and data extraction means operable to handle data messages simultaneously received on at least two said local receivers and storage means for storing packets of data extracted from the messages, means for operating in an inter-network gateway mode, said means for operating comprising means for identifying a signal received on one of said local receivers as being a signal transmitted from an adjacent packet radio network, means responsive to said means for identifying, for causing one of the local receivers to be tuned to a same frequency $f_1$ as another receiver in said adjacent network, means for causing a packet which has been received on a different local receiver, from a different transceiver in said transceivers own network, to be stored and then to be transmitted to a transceiver in said adjacent network on said frequency $f_1$ together with an identification of said packet as an inter-network message, and means responsive to a local receiver receiving a packet associated with an identification of the packet as an inter-network message to cause an acknowledgement of receipt of the packet associated with the inter-network message to be transmitted on the same frequency as that on which the packet and associated identification were received.

17. A transceiver as claimed in claim 16, comprising means for substantially inhibiting the passage of RF energy from said single transmitter to the local receivers at frequencies other than the desired instantaneous single transmitter frequency so that reception is prevented solely in the local receiver tuned to said desired transmitter frequency.

18. A transceiver for a packet radio network which comprises a plurality of other transceivers, said transceiver including means for transmitting, storing and receiving packets of data, wherein said transceiver comprises a plurality of local receivers which are independently automatically tunable during operation, and a single transmitter which in operation is tunable to the frequencies of the local receivers, further comprising means for receiving a control signal via one of said local receivers, and means responsive to said control signal for controlling a tuning frequency of at least one of said local receivers to be the same as the respective tuning frequencies of respective other receivers in an other transceiver operating as part of the packet radio network, means for operating in a voice net mode, said means comprising demodulating means for demodulating a voice message received on at least one local receiver simultaneously with the reception and demodulation of messages on the remaining local receiver(s), gateway means for operating in an inter-network gateway mode, said gateway means comprising means for identifying a signal received on one of said local receivers as being a signal transmitted from an adjacent packet radio network, means responsive to said means for identifying, for causing one of the local receivers to be tuned to a same frequency $f_1$ as an other receiver in said adjacent network, means for causing a packet which has been received on a different local receiver, from a different transceiver in said transceivers own network, to be stored and then to be transmitted to a transceiver in said adjacent network on said frequency $f_1$ together with an identification of said packet as an inter-network message, and means responsive to a local receiver receiving a packet associated with an identification of the packet as an inter-network message to cause an acknowledgement of receipt of the packet associated with the inter-network message to be transmitted on the same frequency as that on which the packet and associated identification were received.

19. A transceiver as claimed in claim 18, comprising means for substantially inhibiting the passage of RF energy from said single transmitter to the local receivers at frequencies other than the desired instantaneous single transmitter frequency so that reception is prevented solely in the local receiver tuned to said desired transmitter frequency.

* * * * *